United States Patent [19]

Menninga

[11] 4,002,952

[45] Jan. 11, 1977

[54] ELECTRIC OVERVOLTAGE ARRESTER WITH CARBON AIR GAP AND GAS TUBE

[75] Inventor: Gysbert L. Menninga, Highland Park, Ill.

[73] Assignee: CEAC of Illinois, Inc., Rosemont, Ill.

[22] Filed: Apr. 25, 1975

[21] Appl. No.: 571,580

[52] U.S. Cl. .................................. 317/66; 317/62; 337/32

[51] Int. Cl.[2] .......................................... H02H 9/06

[58] Field of Search ............... 317/62, 61, 61.5, 66, 317/69, 70, 16; 313/244, 246, 247; 337/15, 32, 33, 34

[56] References Cited

UNITED STATES PATENTS

| | | | |
|---|---|---|---|
| 1,201,646 | 10/1916 | Steinmetz | 317/62 |
| 1,294,466 | 2/1919 | Houskeeper | 317/62 X |
| 2,637,827 | 5/1953 | Boyer et al. | 313/247 X |
| 2,792,471 | 5/1957 | Baxter et al. | 317/66 |
| 3,569,786 | 3/1971 | Kunugi | 317/70 X |
| 3,626,237 | 12/1971 | Bolton et al. | 317/61 X |
| 3,703,665 | 11/1972 | Yereance et al. | 317/61 |
| 3,886,411 | 5/1975 | Klayum | 317/62 |

*Primary Examiner*—J D Miller
*Assistant Examiner*—Patrick R. Salce
*Attorney, Agent, or Firm*—Russell H. Clark

[57] ABSTRACT

The invention concerns overvoltage arresters and its basic objective is to combine a carbon air gap device with a novel and improved surge voltage gas tube, the combination also including a fusible element and a coil spring. The coil spring becomes effective upon melting of the fusible element to connect the transmission line to ground so as to short out both the carbon air gap device and the gas tube thereby preventing overheating of the same. The carbon air gap device and the gas tube are so combined as to obtain the advantages of both, namely the long life advantages of the gas tube and the reliability of the carbon air gap device. The two devices are combined in such a manner whereby the carbon air gap device is a back-up for the surge voltage gas tube.

10 Claims, 8 Drawing Figures

Fig. 1.
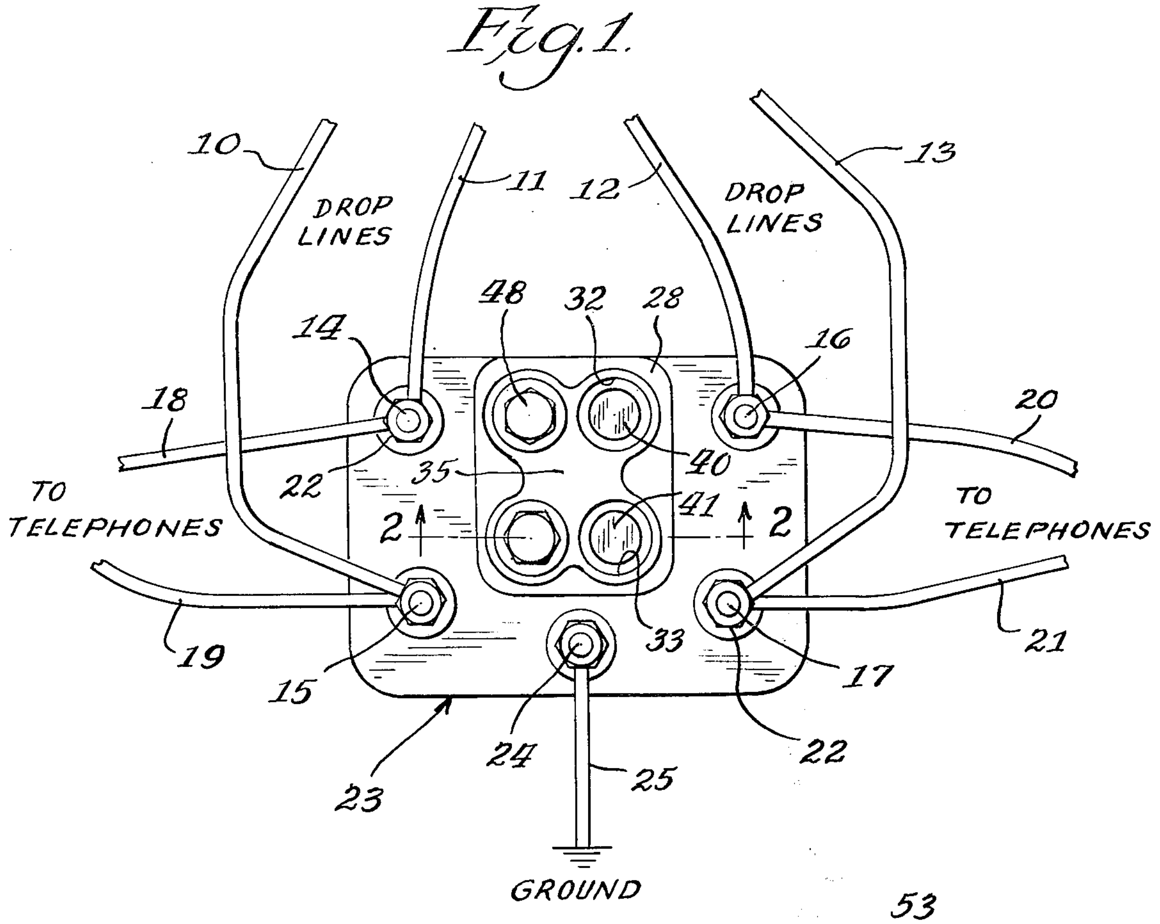
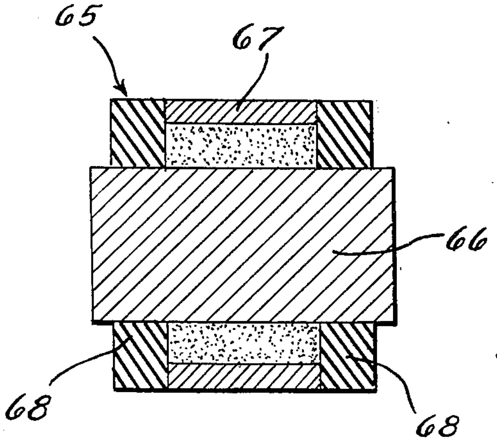
Fig. 5.
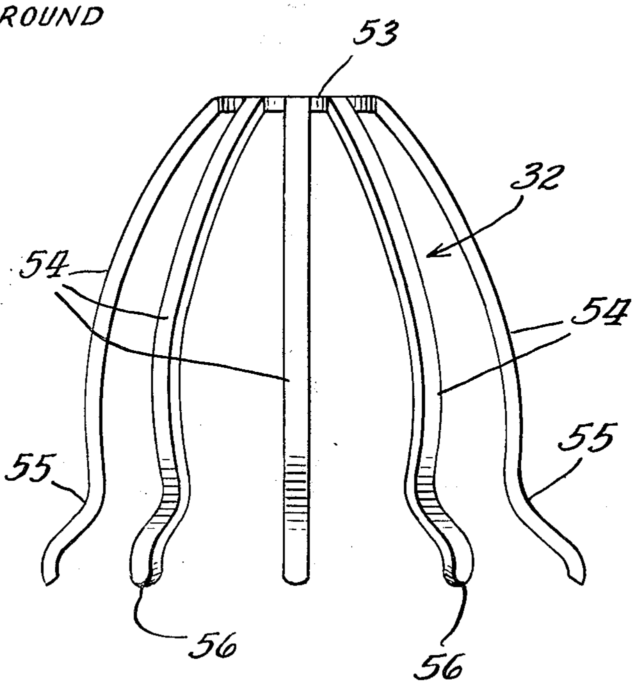
Fig. 6.

ELECTRIC OVERVOLTAGE ARRESTER WITH CARBON AIR GAP AND GAS TUBE

The invention relates to electric overvoltage arresters primarily for use in protecting telephone equipment and has reference in particular to devices of this nature wherein a carbon air gap device is combined with a surge voltage gas tube.

When a high voltage surge, such as lightning, is applied to a transmission line protected by a surge voltage gas tube, the gas tube becomes conductive since the gas within the tube is ionized and the same operates to limit the voltage on the line by shunting the current to ground. After the surge has passed the gas tube returns to a normal non-conducting state. Also with an extended period of excessive voltage, such as from a power fault, the gas tube will become conductive to limit the voltage by shunting the same to ground, although while conductive the tube will generate considerable heat.

Carbon air gap devices have certain advantages in operation which are not inherent in surge voltage gas tubes. Primarily the carbon air gap devices have greater reliability in always limiting voltage to safe levels. Also said devices are more reliable than gas tubes since the tubes may fail due to long term leakage, or shock, or the tubes may fail due to damage from mishandling before installation. Another advantage of the carbon air gap devices resides in the fact that the same never fail in the open or high voltage breakdown condition. When they fail it is in the shorted or low resistance condition which thereby alerts the telephone craftsmen by making the transmission line noisy or be grounding it. The gas tube however, fails in the high voltage breakdown region usually above safe levels if the seal is broken.

In the event of such a failure of the gas tube, it would not be known until some damage may have taken place, such as a fire, or electric shock indicated the problem. Accordingly the use of gas tubes alone are not approved for residences or business installations. There are no reliable methods of control without removing the arrester devices from service and checking the same all of which would require costly field visits. However gas tubes have an important and desirable advantage in that in normal usage they will operate for thousands of surges before failure whereas the carbon air gap devices usually fail after about twenty to fifty surges.

The basic objective of the present invention is to combine a surge voltage gas tube with a carbon air gap device to thus provide a novel and improved electric overvoltage arrester which will be highly efficient in operation since the advantages of both said devices will be obtained and wherein space requirements will be met so as to allow interchangeability between existing arresters now in use and the present improved arrester.

Another object of the invention is to provide an electric overvoltage arrester primarily for use in telephone equipment which will combine a novel and improved gas tube with a carbon air gap device so as to obtain the long life advantages of the gas tube with the reliability of the carbon air gap device in always limiting voltages to safe levels. The two devices are combined in such a manner whereby the carbon air gap device is a back-up for the surge voltage gas tube.

Another objective of the invention resides in the provision of an overvoltage arrester as described which will include in combination a surge voltage gas tube, a carbon air gap device, a fusible element and a coil spring, with the said spring becoming effective upon melting of the fusible element to connect the transmission line to ground. As a result of the grounding connection, the gas tube and carbon air gap device are both shorted out and overheating of the same is effectively prevented.

A further object of the invention is to provide a combination gas tube and carbon air gap arrester wherein a new and improved gas tube is employed characterized by an axial center electrode and a cylindrical outer electrode with the center electrode projecting from both ends and eith the electrical discharge taking place radially to the outer electrode. With a gas tube having these characteristics it is possible to met the space requirements of the small metal shell or housing of the arrester since the carbon air gap device and the gas tube have electrically parallel circuits.

With these and other objects in view, the invention may consist of certain novel features of construction and operation as will be more fully described and particularly pointed out in the drawings, specification and claims appended thereto.

In the drawings which illustrate an embodiment of the improved arrester device and wherein like reference characters are used to designate like parts;

FIG. 1 is a top plan view showing a typical telephone installation for a plurality of drop lines and wherein each line is protected by the overvoltage arrester device of the invention;

FIG. 5 is a sectional view taken axially of the novel surge voltage gas tube used in the arrester shown in FIGS. 2, 3 and 4;

FIG. 6 is an elevational view of the shorting basket having resilient fingers for contacting the metal housing and also the outer electrode of the gas tube;

Figure 2:
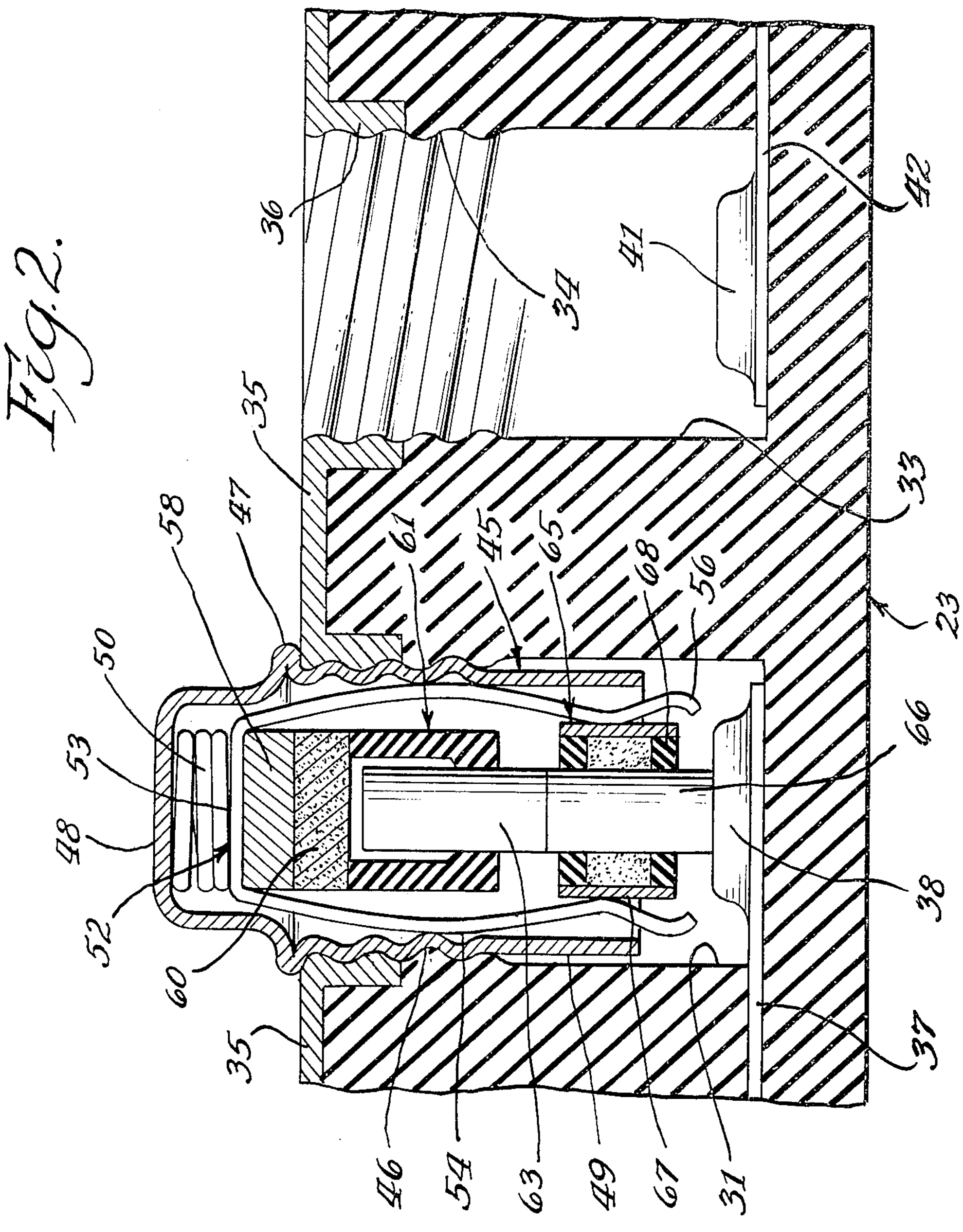
FIG. 2 is a fragmentary vertical sectional view taken substantially along line 2—2 of FIG. 1, the view showing the parts on an enlarged scale to better illustrate the novel combination of a gas tube with a carbon air gap device.

Referring to the drawings, FIG. 1 shows in plan view a subscribers telephone installation having a plurality of drop lines 10–11 and 12–13 which are respectively connected to the binding posts 14–15 and 16–17. The conductors 18–19 and 20–21 leading to the telephones are also connected to the binding posts 14–15 and 16–17 and the wires are held to each of the binding posts by the lock nuts 22. The respective posts are spaced as shown and the same are anchored in a base member 23 of any suitable insulating material such as a ceramic, hard rubber or a durable insulating plastic. A fifth binding post 24 is also anchored in the member 23 and the same is connected by conductor 25 to the ground as shown.

The said base member includes an integral, substantially square upright support portion 28, also shown in FIG. 2, and which is recessed in four locations to provide openings for receiving the arrester device of the invention. The recesses are indicated by numerals 30 and 31 on the left side and by numerals 32 and 33 on the right side of the support portion. Each of the rerecesses are provided with grooves in their side wall to form the screw threads 34 and also it will be observed that the screw threads are continued into the metal plate 35 which is embedded in the support portion 28 substantially flush with the top surface thereof. The plate 35 has four depending circular portions 36 each being aligned with one of the recesses and having grooves in their interior surface to fit with the groove 34 so that the screw threads for each recess is continuous from the top surface of plate 35 to approximately half of the depth of the recesses.

The metal plate 35 is electrically connected to binding post 24 by conductor means embedded in the base member 23 and thus said plate is a grounding plate since the post 24 has been described as connected by conductor 25 to ground. Additional conductors are embedded in the base member 23, one for each of the binding posts 14, 15, 16 and 17. FIG. 2 shows the embedded conductor 37 which is electrically connected to binding post 15, the said conductor having the terminal button 38 integral therewith and which is centrally positioned in the bottom of recess 31. A similar embedded conductor is provided for binding post 14 and associated opening 30. Also for the post 16 the embedded conductor has the terminal button 40 in the bottom of recess 32 and the terminal button 41, FIG. 2, in the bottom of recess 33 is integral with the embedded conductor 42 having electrical connection with binding post 17.

Figure 3:
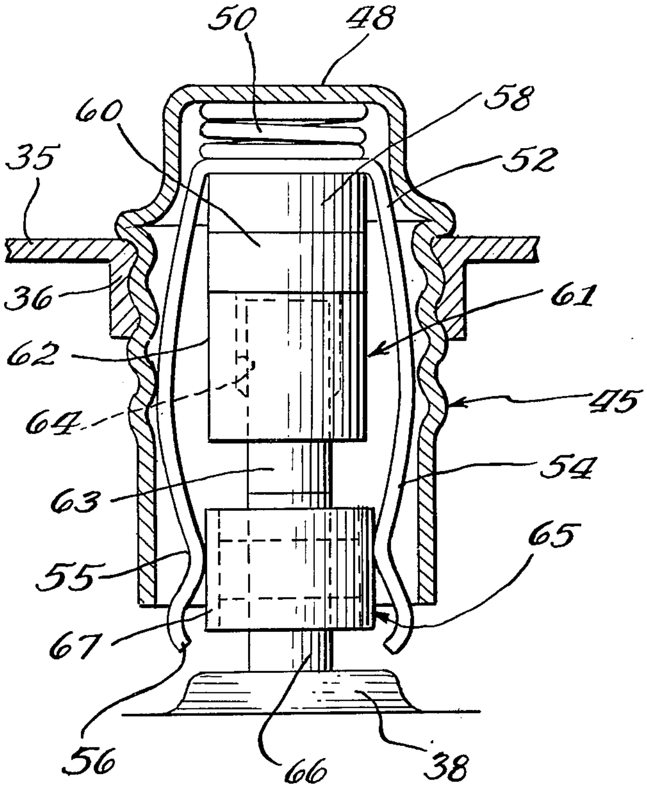
FIG. 3 is a vertical sectional view of the metal housing with the several elements including the fusible element in associated relation as normally installed.
Figure 4:
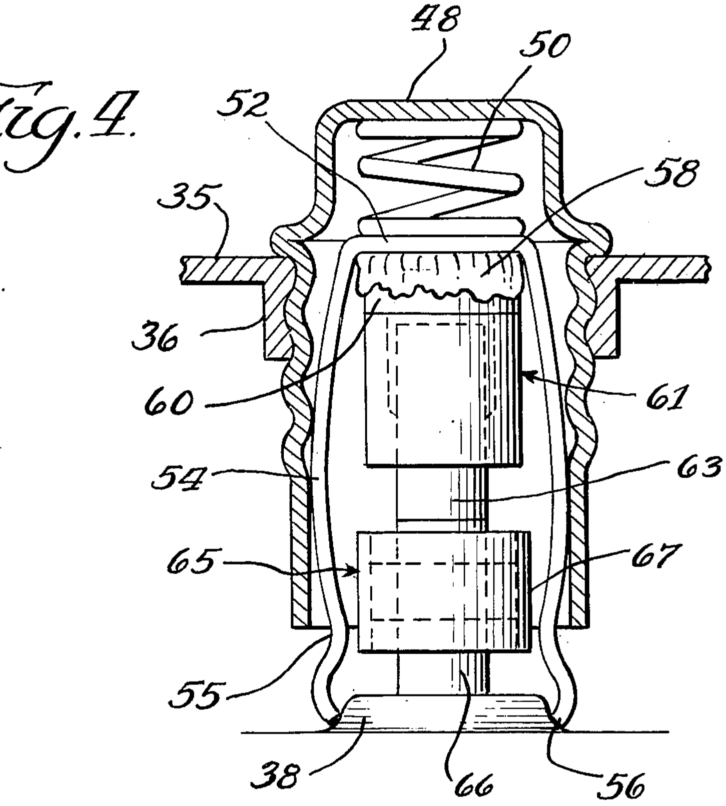
FIG. 4 is a vertical sectional view similar to FIG. 3, but illustrating the action of the spring mechanism in making a ground connection to short cut both the carbon air gap device and the gas tube upon the melting of the fusible element.

The overvoltage arrester device of the invention is best shown in FIGS. 2, 3 and 4, wherein the numeral 45 indicates a metal shell or housing of substantially cylindrical shape having grooves formed in its side walls to provide screw threads 46 for co-action with the screw threads 34 when the housing is threaded into its particular opening. The stop flange 47 may be formed integrally with the metal housing and above the stop flange the housing includes the metal cap 48. Below the screw threads 46 formed in the housing, the same terminates in a cylindrical skirt portion 49. Thus it will be understood that the cylindrical housing member or shell retainer 45 is a unitary element, being formed of any suitable conductive metal and having a closed top and an open bottom end. The housing retains the several elements comprising the combination carbon air gap device and gas tube arrester and these will now be described in detail.

Immediately below the cap 48, the housing member 45 retains a coil spring 50 which is in electrical contact with the cap. Whereas the coil spring at its upper end engages the cap of the housing, the said spring at its lower end engages the shorting basket 52. Said basket functions as the movable shorting element of the arrester, the same effecting a metallic grounding connecton between the terminal button 38, FIGS. 2, 3 and 4, and the metal housing 45 upon melting of the fusible element 58. The shorting basket 52 has a flat top portion 53 and a plurality of spring fingers 54, which are bowed outwardly and then inwardly as at 55 to form the depending contact ends 56. The shorting basket is formed so that the fingers have a tendency to spring outwardly as shown in FIG. 6, and it will also be observed that the fingers at 55 have contact with the outer electrode of the gas tube for purposes which will be fully explained as the description proceeds.

The top portion 53 of the shorting basket rests on the fusible element 58 which in turn has contact with and rests on the carbon disc 60, one of the parts of the carbon air gap device indicated in its entirety by the numeral 61. The fusible element may be composed of an alloy preferrably an eutectic alloy and which may contain the metals bismuth, tin and lead and have a melting point below 365° Fahr. More particularly the melting point of the fusible element may range from 180° to 210° with a desirable melting point around 200° Fahr.

Another part of the carbon air gap device comprises the insulating housing or spacer 62 which may be formed of a ceramic or other good insulating material and which retains the carbon rod 63. Said rod extends axially through the insulating housing 62 and is sealed to the same with its upper end terminating several thousands of an inch below and out of contact with the carbon disc 60. An air gap is thus provided within the device and also it will observed that an annular space exists at 64 between the carbon rod and the upper interior of the ceramic housing.

A surge voltage gas tube 65, such as shown in FIG. 5, is combined with the carbon air gap device to form the arrester of the invention. The center metal electrode 66 extends axially through the outer metal electrode 67 to project a short distance from both ends of the gas tube device. The outer electrode is a cylinder as shown in FIGS. 2, 3 and 4 and the inner circumference of the same is about five hundreds of an inch larger in diameter than that of the center electrode. The electrodes are joined in said spaced relation by the end rings 68 of insulating material, which may comprise a ceramic or the like, the same being hermically sealed to form a chamber for containing a special gas, such as argon, which is a good insulator until it is ionized. The electrodes 66 and 67 are typically of a metal that has an expansion coefficient similar to the insulating end rings 68 and the center electrode can be solid or hollow or partically hollow. As regards the present application the gas tube should break down at about 350 volts direct current, and the size of the tube should approximate about 3 to 4 tenths of an inch in diameter with a length of about the same, namely 3 tenths of an inch, or possibly somewhat smaller about 2 ½ tenths of an inch.

In view of the foregoing it will be appreciated that the present arrester has size restraints in order to provide a direct replacement for existing arresters or for use in new protectors that would allow interchangeability between existing arresters in use and the present arrester. It is estimated that the size limit for the present arrester is about 1 inch in overall length by about one half an inch in diameter.

It is necessary that the combined gas tube and carbon air gap device be compatible electrically. In order for the gas tube-air gap arrester to benefit the user it must do two basic things that require compatibility. The gas tube must arc and operate before the carbon air gap device on voltages ranging from direct current to wave fronts, with voltage rises of as much as 1000 volts per microsecond. This prevents the early failure of the carbon air gap device. The voltage at which the carbon air gap device operates must be at voltage levels that are not above an unsafe level. Typically the gas tube or carbon air gap device operate to prevent voltage levels on a transmission line from exceeding about 500 volts direct current or 60 hertz to about 1000 volts with a very fast rate of rise such as 1000 volts per microsecond. Because various telephone supervisory and signal levels such as the battery feed for dialling and the ringing signals may be as high as 200 volts with even higher voltages in some cases, the gas tube or carbon air gap device should not operate at voltages below about 250 volts.

Figure 7:
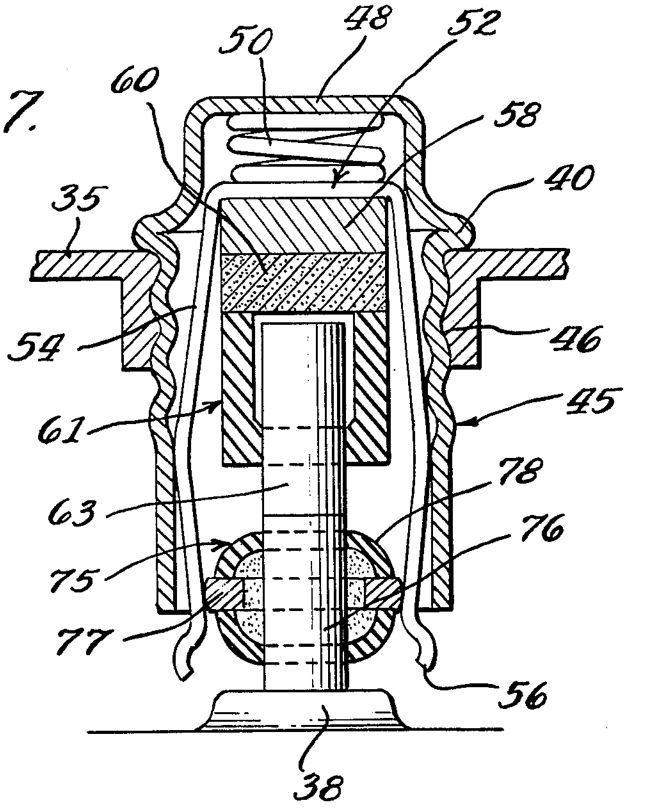
FIG. 7 is a vertical sectional view similar to FIG. 2, of the metal housing and assembled elements, but showing a modified form of the invention.
Figure 8:
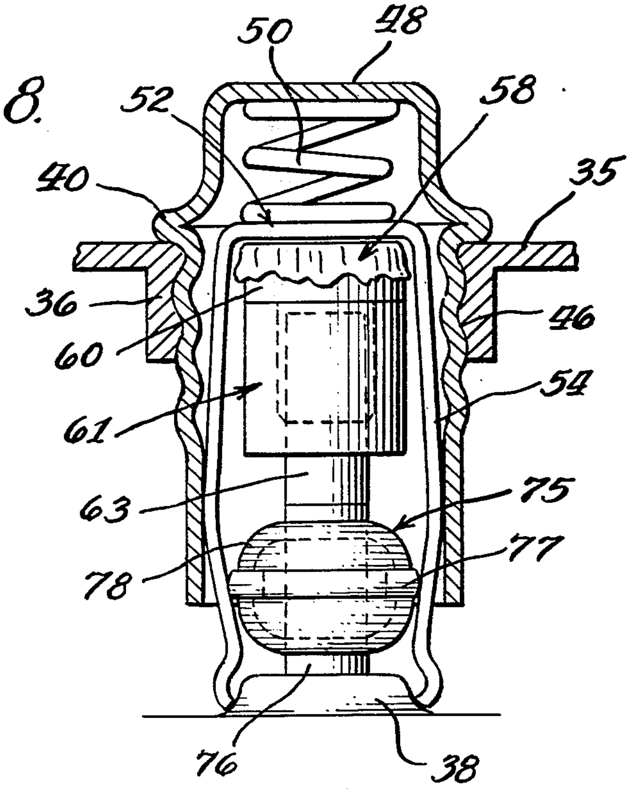
FIG. 8 is a vertical sectional view similar to FIG. 7, but showing the various elements in the position they assume in making a metallic connection to ground upon the melting of the fusible element.

The modified form of the invention shown in FIGS. 7 and 8 embodies the same elements and has substantially the same mode of operation as the arrester of FIGS. 2, 3 and 4. The metal housing 45 is threaded at 46 and has a stop flange 47 and also a cap 48 of hexagonal shape. The coil spring 50 is disposed within the cap and said spring rests on and has contact with the top of the shorting basket 52. Within the resilient fingers 54 of the basket there is assembled in vertical alignment the fusible element 58, the carbon disc 60, the ceramic housing 61 having the carbon rod 63 and the gas tube 75 of somewhat modified construction from that as previously described. Said gas tube, best shown in FIG. 7, has a center electrode 76 which extends axially through the outer electrode 77 to project a short distance from both ends. The electrodes are formed of a metal having an expansion coefficient similar to the insulating housing 78 of ball shape and which may comprise a ceramic. The insulating housing is sealed to the ring shaped outer electrode 77 being also sealed to the center electrode 76. The chamber thus formed contains a special gas as described and the space between the two electrodes may approximate about five hundreds of an inch. The modified form of gas tube calls for a somewhat varied shape for the fingers 54 of the shorting basket but the operation of both said shorting baskets is the same and which will be described.

The gas tube and carbon air gap device are combined with each other and with a shorting basket and fusible element so as to provide special grounding mechanism whereby both devices are shorted out in the event the fusible element should melt due to excessive heat such as may be generated by either the gas tube or the carbon air gap device. During even relatively short periods of conduction either of said devices can generate enough heat to ignite anything that may be near or in contact with them. In such an event the fusible element would melt as illustrated in FIGS. 4 and 8, and the respective coil springs would then take over and force the shorting basket in a downward direction until ends 56 contact the terminal button 38 to effect a metallic connection to ground. Consequently both devices are bypassed and the heating problem is effectively eliminated.

In the gas tubes 65 and 75, the center electrode extends axially of the outer electrode to project from both ends. This adds to the utility of the gas tube. In the combination as disclosed, the central metal electrode of the gas tube and the carbon rod of the air gap device provide a metal-carbon interface which is electrically common in that both said elements are at the same voltage potential. Also it may be noted that the gas tubes 65 and 75 discharge in a radial manner and as a result it is possible to combine such a gas tube with a carbon air gap device within the small space of the metal housing in an operative manner since electrically parallel circuits are provided for conductng the surge voltages to ground. To insure the conductivity of the gas tube circuit, the shorting basket has the spring fingers 54 which when free extend outwardly as shown in FIG. 6. Thus when the shorting basket is assembled within the metal housing, the fingers are biased into contact with the outer metal electrode either 67 or 77 of the gas tubes.

The fusible element 68 may have a location between the center metal electrode 66 or 76 and the carbon rod 63. Also a hollow center electrode with the fusible element partially within and with the carbon rod against the fusible element are possibilities within the concept of the invention. In all forms of the same the arrester will provide adequate protection against surge voltages with protection against overheating by means of the metallic connection in shorting to ground. Further the combination of a gas tube and carbon air gap device in a unitary arrester gives the advantages of the long life of a gas tube and the reliability of a carbon air gap device of always limiting the surge voltages to safe levels.

I claim:

1. In an electrical overvoltage arrester of the character described, in combination wih a metal housing of cylindrical shape and having a closed top and an open bottom, of a metal shorting basket within the housing disposed substantially axially thereof, a carbon air gap device and a surge voltage gas tube in an operative combination and having an aligned relation within the shorting basket, the surge voltage gas tube discharging radially to an outer peripheral electrode and then to the shorting basket having contact therewith, whereby the conductive path for said discharges is parallel to the conductive path for discharges taking place through the carbon air gap device, both said conductive paths including the shorting basket.

2. An electric overvoltage arrester as defined by claim 1, additionally including a coil spring confined between the closed top of the metal housing and the shorting basket, whereby the said parallel conductive paths include the coil spring and then to the metal housing with which the coil spring contacts.

3. An electric overvoltage arrester as defined by claim 2, additionally including a fusible element disposed within the shorting basket and having a location in said aligned relation of the carbon air gap device with the said surge voltage gas tube.

4. In an electrical overvoltage arrester of the character as described, a metal housing member substantially cylindrical in shape and having a closed top and an open bottom, a metal shorting basket within the housing member and having a flat top and a plurality of resilient fingers which depend longitudinally, a coil spring confined between the closed top of the housing and the flat top of the shorting basket, means within the shorting basket in axial alignment including a fusible element, a carbon disc, the carbon rod of an air gap device and the center electrode of a surge voltage gas tube, said means at one end having electrical contact with the top of the shorting basket, whereas its other end is adapted to have electrical contact with a terminal button, and said resilient fingers having contact with an outer peripheral electrode of said gas tube.

5. An electric overvoltage arrester as defined in claim 4, wherein the center electrode of the gas tube projects a short distance from each end of the same, and wherein the gas tube discharges radially from the center electrode to the outer peripheral electrode.

6. An electric overvoltage arrester as defined in claim 4, wherein the carbon air gap device additionally includes a cylindrical housing of insulating material which retains the said carbon rod below and out of contact with the carbon disc to provide the air gap, and wherein the center electrode of the gas tube projects from each end thereof to contact the said carbon rod and the terminal button respectively.

7. An electric overvoltage arrester as defined in claim 6, wherein the gas tube discharges radially from the center electrode to the outer peripheral electrode, and wherein the fingers of the shorting basket contact the said outer electrode, whereby the discharge voltages are carried by the fingers to the metal housing through the coil spring.

8. In an overvoltage protective installation for electric transmission lines, the combination with an insulating support member having an opening in its top surface with a terminal button on the bottom wall of the opening, and a metal grounding plate provided by the support member in encircling relation with the opening, an overvoltage arrester including a metal housing disposed in fixed relation in the opening and in contact with the grounding plate, said housing having a closed top and an open bottom, a metal shorting basket positioned axially within the housing and having a plurality of resilient fingers depending downwardly, a coil spring confined between the closed top of the housing and the top of the shorting basket, a carbon air gap device and a surge voltage gas tube in an operative combination and having an aligned relation within the shorting basket, said air gap device including a carbon rod in spaced relation at one end with a carbon disc to form an air gap, the gas tube including a center electrode and an outer peripheral electrode so that the same discharges radially, the center electrode at one end contacting the carbon rod with its other end having contact with the terminal button, and said resilient fingers having contact with the outer electrode, whereby the radial discharges of the gas tube are carried by the fingers to the metal housing through the coil spring and then to ground.

9. An overvoltage protective installation for electric transmission lines as defined by claim 8, additionally including a fusible element having location within the shorting basket between the top of the same and the carbon disc.

10. An overvoltage protective installation for electric transmission lines as defined by claim 8, wherein the resilient fingers of the shorting basket have a special shape whereby at a midway location they contact the inside surface of the metal housing in addition to also contacting the outer peripheral electrode of the gas tube.

* * * * *